Feb. 14, 1933.

J. V. BREISKY

PROTECTIVE SYSTEM

Re. 18,740

Original Filed July 27, 1926

WITNESSES:

E. J. Weller.

E. R. Evans

INVENTOR

John V. Breisky.

BY

Wesley G. Carr

ATTORNEY

Reissued Feb. 14, 1933 Re. 18,740

UNITED STATES PATENT OFFICE

JOHN V. BREISKY, OF PITTSBURGH, PENNSYLVANIA, ASSIGNOR TO WESTINGHOUSE ELECTRIC & MANUFACTURING COMPANY, A CORPORATION OF PENNSYLVANIA

PROTECTIVE SYSTEM

Original No. 1,764,385, dated June 17, 1930, Serial No. 125,144, filed July 27, 1926. Application for reissue filed January 15, 1931. Serial No. 509,041.

My invention relates to protective systems for electrical circuits.

An object of my invention is to provide a circuit-interrupter having an operating coil and means for energizing the coil from the circuit under predetermined conditions, said means including an electro-ionic tube and a contact device associated therewith for rectifying and controlling the magnitude of the current through the operating coil of the interrupter.

Another object of my invention is to provide, in connection with a relay-controlled automatic circuit-interrupter, means for controlling the operating current for the circuit-interrupter and for limiting the current traversing the realy contact members.

A further object of my invention is to provide, in connection with a relay-controlled automatic circuit-interrupter, improved means for securing a definite time delay in the operation of the interrupter.

Figure 2:
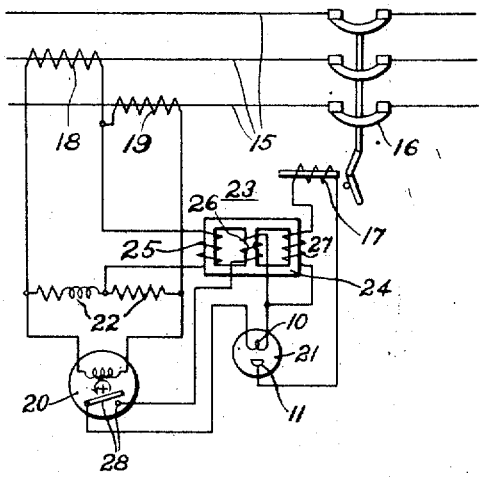
Figure 1:
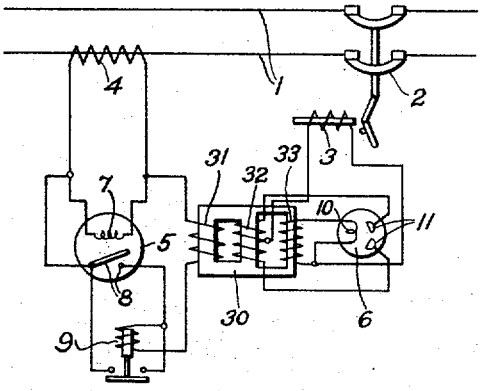

For a better understanding of my invention, reference should be had to the accompanying drawing, in which:

Figure 1 is a diagrammatic view of a protective system including an over-current relay and circuit-interrupter embodying my invention; and Fig. 2 is a similar view of a polyphase circuit-interrupter responsive to different electrical conditions embodying my invention.

Referring to Fig. 1, an electrical circuit 1 is shown having a circuit-interrupter 2 therein adapted to be controlled by a tripping coil 3 upon the occurrence of predetermined electrical conditions in the circuit. In accordance with my invention, the energization of the tripping coil 3 is controlled by the current transformer 4, and electromagnetic relay 5 and an electro-ionic device 6 connected to the relay 5 through an auxiliary transformer 30 and the tripping coil 3.

The electromagnetic relay 5 is provided with an actuating winding 7 connected to the terminals of the secondary winding of the current transformer 4 and with cooperating contact members 8 controlled by the actuating winding 7. An auxiliary relay 9 is connected to the contact members 8 of the relay 5 and is adapted, when operated, to close a shunt circuit around the contact members 8.

The electro-ionic tube 6 may be of the thermionic or heated-cathode type as shown, and comprises an envelope in which the filamentary cathode 10 and anodes 11 are disposed. The envelope may be exhausted or may be filled with an inert gas, such as neon or argon. Furthermore, the filamentary cathode shown may be replaced by other forms of electron-emitting cathodes, which are well-known, or the device 6 may be replaced by other electro-ionic current-controlling devices having similar characteristics.

An auxiliary transformer 30 is interposed between the current transformer 4 and the cathode and anode circuits of the electro-ionic tube 6. The transformer 30 comprises three legs on which windings 31, 32 and 33 are disposed. The winding 31 is connected across the current transformer 4 in series with the contact members 8 of the relay 5. The winding 32 is connected in series with the tripping coil 3 of the circuit-interrupter 2 and the anodes and cathode of the electro-ionic device 6. As shown, the device 6 comprises two anodes 11 arranged to provide full-wave rectification of the current through the tripping coil 3. The winding 33 is connected to the cathode 10 of the electro-ionic device 6 and may be restricted in cross section in order to limit the cathode-heating current to a safe value.

If the circuit 1 is traversed by an excessive current, the over-current relay 7 is operatively energized and closes its contact members 8, thereby closing the circuit of the cathode 10 of the electro-ionic tube 6. After a definite time delay, which is required for the cathode 10 to reach the electron-emitting temperature, a current is established in the anode circuit of the electro-ionic tube 6 and the tripping coil 3 is operatively energized to open the circuit-interrupter 2.

The time delay may be made small or even substantially eliminated if desired by reducing the mass of the cathode or increasing the filament current.

In some cases, a definite time delay in the operation of a circuit-interrupter is desired irrespective of the magnitude of the overload or other abnormal condition to which the circuit-interrupter responds, while in other cases, the circuit-interrupter should open practically instantaneously even upon a relatively small overload. If the relay 5 is of the induction type, the desired time element may be obtained by the adjustment of the relay. If the electro-ionic tube is arranged to introduce a time delay in the operation of the circuit-interrupter, an additional time element is obtained or the relay 5 may be an instantaneous relay, such as the solenoid type. If the relay 5 is an instantaneous relay and the electro-ionic tube is instantaneously operative, as would be the case if the cathode 10 is of small mass or normally at or near the electron-emitting temperature, there is no time element in the operation of the circuit-interrupter.

When the contact members 8 of the relay 5 engage, the relay 9 becomes energized and closes a shunt circuit around the contact members 8 until the circuit-interrupter 2 operates. The operation of the circuit-interrupter is therefore independent of chattering of the contact members 8 and the contact members are not required to interrupt the heating current of the cathode 10. The electro-ionic device 6 serves not only to provide a definite minimum time delay, where a time delay is desirable, in the operation of the circuit-interrupter 2 but also rectifies the current through the tripping coil 3 so that an ordinary direct-current tripping coil may be used.

In many instances it is desirable to vary the time adjustment of the circuit-interrupter in order to secure the selective operation of several circuit-interrupters connected in series or for some other purpose. In such systems, the disconnection of only the faulty section is obtained by increasing the time element of the circuit-interrupter nearest the station. This is accomplished in the system which I have described as indicated above by either changing the time adjustment of the over-current relay 5, by increasing the thermal lag of the cathode 10, as by increasing its mass or by delaying the increase of anode or cathode potential to the operating value.

It will be apparent that the system which I have described has several advantages over prior systems. A sensitive auxiliary relay may be employed in connection with the electro-ionic tube and the tube limits the current through the contact members of the relay to prevent injuring the same. Furthermore, the electro-ionic tube not only provides a definite minimum time delay in the operation of the circuit-interrupter but by rectifying the tripping current, improves the operation of the tripping coil when energized directly from an alternating-current circuit.

The principles of my invention may be applied to polyphase circuits and to other forms of contact devices or protective relays. For example, in Fig. 2 I have shown a three-phase circuit 15 having a circuit-interrupter 16 therein provided with a tripping coil 17. The energization of the tripping coil 17 is controlled as before by current transformers 18 and 19, a relay 20 and an electro-ionic device 21.

The current transformers 18 and 19 are connected in separate phases of the circuit and a network 22 is connected between said current transformers and the actuating winding of the relay 20 so that the relay is energized, for example, in proportion to the positive phase-sequence component of current in the circuit 15. An auxiliary transformer 23 is provided having a magnetizable core member 24 on the three legs of which the windings 25, 26 and 27 are disposed.

The winding 25 of the auxiliary transformer is connected to the current transformers 18 and 19. The winding 26 is connected in series with the cathode 10 of the electro-ionic device 21 and the contact members 28 of the relay 20. The winding 27 is connected in series with the tripping coil 17 in the anode circuit of the electro-ionic device 21. This arrangement permits the anode potential to be selected independently of the potential applied to the cathode and to be changed without altering the cathode potential. The leg of the transformer 23 on which the winding 26 is disposed, may be so restricted in cross-section, as indicated, as to become magnetically saturated in order to limit the current traversing the cathode 10 and the contact members 28 of the relay 20.

When the positive phase-sequence component of current in the circuit 15 exceeds a predetermined value, the relay 20 is operatively energized and closes the circuit of the cathode 10 of the electro-ionic device 21. After a time delay required to heat the cathode 10 to the electron-emitting temperature, a current traverses the anode circuit of the electro-ionic device 21 and the tripping coil 17 of the circuit-interrupter 16 is operatively energized, thereby opening the circuit.

I have shown different modifications of my invention in order to illustrate the principles thereof more clearly. Various other modifications within the scope of my invention will occur to those skilled in the art and therefore I desire that my invention shall not be limited in scope except as indicated in the appended claims.

I claim as my invention:

1. In an electrical circuit having a circuit interrupter therein and an actuating winding therefor, a thermionic device having an anode and a cathode, a transformer core having a winding thereon for energization in accordance with an electrical condition in said circuit, a second winding on said core for energizing said cathode and means for limiting the energization thereof, and a third winding on said core for energizing the actuating winding of said interrupter through a circuit including the anode and cathode of said thermionic device.

2. In an electrical circuit having a circuit interrupter therein and an actuating winding therefor, a thermionic device having an anode and a cathode, a triple-leg transformer core having a winding on one of the legs thereof for energization in accordance with an electrical condition on said circuit, a winding on another leg of said core for energizing said cathode and means embodied in said leg for limiting the energization of said cathode, and a winding on the third leg of said core for energizing the actuating winding of said interrupter through a circuit including said anode and cathode in series relation.

3. In an electrical circuit having a circuit interrupter therein and an actuating winding therefor, a thermionic device having an anode and a cathode, a transformer core having a winding thereon for energization in accordance with an electrical condition in said circuit, a second winding on said core for energizing said cathode, means for limiting the energization thereof, and a third winding on said core for energizing the actuating winding of said interrupter through a circuit including the anode and cathode of said thermionic device, and means operable in response to a predetermined condition on said circuit for controlling the operation of said thermionic device.

4. In a polyphase electric circuit having a circuit interrupter and an actuating winding therefor, a thermionic device having a cathode and an anode, a transformer core having a winding thereon and means for energizing said windings in accordance with the current traversing said circuit, a second winding on said core for energizing said cathode, a third winding on said core for energizing the actuating winding of said interrupter through a circuit including said anode and cathode in series relation, and means responsive to the phase-sequence characteristics of said circuit for controlling the energization of said thermionic device.

5. In protective apparatus for an alternating-current circuit, a circuit interrupter, a thermionic device having a cathode and an anode, transforming means comprising a primary winding energized from said circuit, a magnetic core element energized by said primary winding, said core element having parallel branches of different reluctance characteristics such that the flux which can be induced in one of said branches is of substantially limited maximum value and a winding interlinked with said last-mentioned branch for supplying heating current to said cathode, means for applying an anode voltage to said device, and means responsive to the anode current of said device for operating said interrupter.

6. In protective apparatus for an alternating-current circuit, a circuit interrupter, a thermionic device having a cathode and an anode, transforming means comprising a primary winding energized from said circuit, a magnetic core element having a first branch interlinked with said primary winding and having second and third branches of different reluctance characteristics such that the flux which can be induced in said second branch is of substantially limited maximum value, a winding interlinked with said second branch for supplying heating current to said cathode and a winding interlinked with said third branch for applying an anode voltage to said device, and means responsive to the anode current of said device for operating said interrupter.

In testimony whereof, I have hereunto subscribed my name this 13th day of January, 1931.

JOHN V. BREISKY.